(12) United States Patent
Kiesling (10) Patent No.: US 7,643,827 B1
(45) Date of Patent: Jan. 5, 2010

(54) SATELLITE BROADCAST COMMUNICATION METHOD AND SYSTEM

(76) Inventor: John D. Kiesling, 1047 Beaumont Rd., Berwyn, PA (US) 19312

( * ) Notice: Subject to any disclaimer, the term of this patent is extended or adjusted under 35 U.S.C. 154(b) by 521 days.

(21) Appl. No.: 11/472,867

(22) Filed: Jun. 22, 2006

(51) Int. Cl.
*H04W 4/00* (2006.01)

(52) U.S. Cl. .................. 455/427; 455/3.02; 455/12.1; 455/67.11; 455/428

(58) Field of Classification Search ......... 455/427–430, 455/12.1–13.2, 3.02, 67.11; 370/318
See application file for complete search history.

(56) References Cited

U.S. PATENT DOCUMENTS

| | | | |
|---|---|---|---|
| 4,855,751 A | 8/1989 | Ingerson | 343/779 |
| 5,924,015 A * | 7/1999 | Garrison et al. | 455/13.4 |
| 6,321,065 B1 | 11/2001 | Wilcoxson et al. | 455/10 |
| 6,421,528 B1 * | 7/2002 | Rosen et al. | 455/67.16 |
| 6,430,418 B1 | 8/2002 | Nivens et al. | 455/522 |
| 6,441,794 B1 | 8/2002 | Tang et al. | 343/781 |
| 6,763,006 B1 | 7/2004 | Lockett | 370/318 |
| 6,795,034 B2 | 9/2004 | Lyerly et al. | 343/781 |
| 6,799,014 B2 | 9/2004 | Rosen et al. | 455/12.1 |
| 6,965,351 B1 | 11/2005 | Miller et al. | 343/781 |
| 2004/0008148 A1 | 1/2004 | Lyerly et al. | 343/781 |

* cited by examiner

*Primary Examiner*—Matthew D Anderson
*Assistant Examiner*—Shaima Q Aminzay
(74) *Attorney, Agent, or Firm*—Michael F. Petock, Esq.; Petock & Petock, LLC (57) ABSTRACT

The invention provides for the design of a single beam communication satellite system covering a single service area, either uplink, downlink or both, by which rain fade effects are totally compensated. The rain fades, characterized by fixed margins, are not exceeded for a certain percentages of time. The service area must be large enough so that the statistical rain fades (in decibels) vary significantly over the service area. The single beam antenna must be electrically large enough and must have a beam forming network capable of multiple component beams so that a gain profile can be established for the antenna which compensates for the fixed margins established over the service area. Since no subscriber has excess fixed margin this results in a minimum power system. Other significant effects such as differences in slant range and other systemic variations over the service area also can be compensated.

13 Claims, 5 Drawing Sheets

SATELLITE BROADCAST COMMUNICATION METHOD AND SYSTEM

FIELD OF THE INVENTION

The present invention relates to a satellite-based communication method and system design. More particularly, the present invention relates to a satellite communication system which produces a single downlink beam from a satellite antenna having a fixed radiation pattern to provide maximum availability due to outage caused by rain to all areas covered for a given power level in an efficient, reliable and cost effective manner.

BACKGROUND OF THE INVENTION

In satellite communication systems, a signal is transmitted between a feeder earth station by means of an uplink to the satellite. The satellite receives the signal, amplifies it and then re-transmits the signal to a service area of the earth's surface by means of a downlink.

Current satellite transmission systems include fixed gain amplifiers with their operating points determined during the design of the communication system to achieve predetermined system performance goals. The transmission systems are designed at their inception with sufficient transmit power to overcome a low probability precipitation event which may otherwise have an adverse effect on signal reception at a particular location within the coverage area of the satellite. For example, a system requiring 99.9% link availability with an accompanying signal loss due to rain in the transmission path will be designed with additional satellite radio frequency (R.F.) transmit power applied to the given downlink antenna beam in order to overcome the effects of the rain. In other words, an availability due to rain of 99.9% defines a fixed margin (measured in decibels) which will not be exceeded more than 0.1% of the time. The fixed margin consists of rain attenuation and in the case of the downlink, an increase in subscriber antenna temperature due to the attenuation. The required fixed margin depends on the local rain rate and, in the case of the downlink, the elevation of the subscriber's antenna, and can vary significantly over the service area. The effects of differences in slant range between the satellite and subscribers also can be taken into account. This R.F. transmit power is constant and cannot be adjusted over the lifetime of the satellite. Furthermore, the transmit power is applied to an antenna beam covering the entire service area. Consequently, satellite power requirements are oversized to achieve the desired link availability and customer satisfaction during anticipated weather conditions. This sizing and utilization of R.F. transmit power is inefficient, particularly where the satellite has a broad coverage area. In general, the cost of a satellite is related to its power rating.

One approach to solving this problem has been to produce a complicated satellite transmission system utilizing many spot beams each of which are adjusted in power level in response to real time weather data for each spot beam. For example, see U.S. Pat. Nos. 6,421,528 B1—Rosen et al. and 6,799,014 B2—Rosen et al. Such a system requires many spot beams and much hardware to accommodate the instantaneous adjustment of the power for each spot beam. This is an inherently large complex system requiring much hardware which is prone to having a lower reliability rating. For example, intense rainfall is characteristic of thunder storms which are typically several miles in extent. The beam elements out of which the pattern would be formed would need to be several miles in extent in order to "track" the rain cells. This may require an antenna on the order of 10 to 15 meters with 500 to 1000 beam elements and a corresponding number of beam forming elements. Considering the power, weight and cost of such an implementation, an improvement is needed in this area.

SUMMARY OF THE INVENTION

The present invention provides a system and method for providing a desired degree or percentage of link availability to earth stations in the service area with a minimum of overall power and a high degree of reliability.

An advantage of the present invention is that the method and system of the present invention provide a means for adjusting the antenna gain profile over the service area in order to exactly compensate for the effects of rain and differences in slant range over the service area. The rain attenuation over the service area is defined statistically as a margin, measured in decibels, which is adequate to achieve the desired availability (due to rain) over a period of time. Also, differences in slant range between the satellite and subscribers scattered over the service area may be taken into account.

An advantage of the present invention is that it provides a fixed antenna design which is cost effective and highly reliable.

Another advantage of the present invention is that the signal availability is met across the wide broadcast area with a reduced overall power level of the satellite, compared to present design approaches.

Another advantage of the present invention is that it may be used to compensate for various factors including differences in slant range, that is the distance from the satellite transmitting antenna to specific areas within the area served by the satellite.

Briefly and basically, in accordance with the present invention, a method of broadcast communication from an earth satellite is provided which comprises the steps of providing an antenna on the satellite having a gain profile, i.e., a specified variation in gain over the service area, in order to meet the availability objectives over the service area due to rain and variations in slant range. The antenna radiation pattern, or gain profile, provides a higher antenna gain to areas having more rain attenuation or having a longer distance to the satellite and less antenna gain to areas having less rain attenuation or having a shorter distance to the satellite. In general, each subscriber in the service area achieves the defined availability objective due to rain with no excess margin. Since there is no excess margin anywhere in the service area, this is the minimum spacecraft power needed to achieve the availability objectives due to rain, using a fixed antenna pattern.

The fixed radiation pattern or gain profile of the antenna may be generated by a reflector antenna, a phased array antenna or a lens antenna with a multi-beam capability.

Broadly as claimed herein, the present invention comprises a method of broadcast communication from an earth satellite which includes the steps of providing a single antenna beam on the satellite to transmit or receive a single beam having the same signal transmitted or received to or from an area on the earth's surface, called the surface area, having differing fixed margins over the service area because of average rain fade statistics. The method further includes the step of providing the antenna with a fixed radiation pattern, the radiation pattern providing relatively increased radiation strength in areas of higher fixed margin and relatively decreased radiation strength in areas of lower fixed margin so that there is no excess fixed margin anywhere in the service area and transmitting or receiving said single beam signal from said fixed radiation pattern antenna to or from said service area.

The claimed method of the present invention pertains to the following conditions:

a. any rain model of sufficient accuracy may be used to generate the availability statistics due to rain, including the ITU P.618 rain model;
b. the satellite may have any number of antenna beams however each antenna beam serves only one service area;
c. subscribers may access any number of satellites;
d. any modulation, analogue or digital may be used;
e. any code such as a turbo code may be used;
f. any signal structure such as frequency division multiplex, FDM, time division multiplex, TDM or code division multiplex, CDM may be used;
g. any access method such as frequency division multiple access, FDMA, time division multiple access, TDMA or code division multiple access, CDMA may be used;
h. any signal type such as voice, audio, video or data may be used;
i. any FCC or ITU service classification such as Broadcasting Satellite Service, BSS, Fixed-Satellite Service, FSS or Mobile Satellite Service, MSS may be used; and
j. any polarization or bandwidth may be used.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a view in perspective of a satellite broadcast communication system in accordance with the present invention. The depicted service area is the continental U.S., or CONUS, served by a satellite with a single beam covering the service area. The service area can be any area of any size over which the effects of rain vary and over which the effects of slant range vary from the satellite to subscribers within the service area. The antenna beam may be an uplink or downlink antenna beam.

FIG. 2 is a block diagram of a typical broadcasting satellite in the 17/12 GHz or 25/17 GHz band. Broadcasting satellites may greatly benefit from the invention and are used herein to demonstrate the advantages of the invention, and, thus, are described in detail. Typically, there are sixteen 24 MHz transponder channels available on each satellite polarization. The 16 received channels are divided into 2 groups of 8 odd or even channels and each group is radiated to the earth via one of two downlink antennas in order to reduce the output multiplexer loss that would occur if adjacent channels were multiplexed. The transponders consist of solid state drivers followed by traveling wave tube amplifiers, TWTAs. The output multiplexer combines the outputs of the 8 transponders into a single port for radiation by one of the downlink antennas. Thus a total of 16 transponder signals are receivable anywhere within the service area. A second satellite, operating at the same orbital location but on opposite polarization increases the capacity to 32 transponder channels.

FIGS. 3A and 3B combine a diagram of a typical offset-fed reflector antenna depicting an offset-fed reflector illuminated by a multiplicity of horns from outside the antenna secondary beam. The beam forming network 18 of FIG. 3A is shown in greater detail in FIG. 3B. The horns are fed by a matrix of fixed power dividers 28 and fixed phase shifters labeled 1 ... N which provide the required power and phase to each feed horn 30 so that the resulting gain profile over the service area meets the requirements developed by the invention. The input to the power divider matrix is from the output of one of the output multiplexers of FIG. 2, providing, for the case of BSS, 8 transponder signals. A phased array or lens antenna also would be fed by a similar matrix of power dividers.

FIG. 4 depicts an example of antenna coverage of CONUS using the invention. The method of the invention accurately and precisely defines the required antenna gain profile which has been embodied into the antenna design, resulting in the constant-gain contours shown. High gain contours are indicated in the southeast where the rain intensity is highest. The contours indicate less gain in the north and west, but with a higher gain in the northwest corner because of the high rain intensity in the vicinity of Seattle.

In FIG. 5, the output power per channel is provided by a number of TWTAs either because the power capability of a single TWTA is exceeded by the design or a number of TWTAs are desired to be used to minimize breakdown. The first two stages of the beam forming network are eliminated resulting in a requirement for four inputs. Each channel provides the four inputs via four high power TWTAs operating via output multiplexers. TWT-1A, 1B, 1C and 1D, in total, provide the necessary channel power. Consequently the power required of an individual amplifier is reduced to one fourth and the power levels appearing in the components between the TWTAs and the beam forming network also are reduced to one fourth. This arrangement is important in satellite broadcasting, for example, because of the very large satellite powers that are required to operate with very small subscriber antennas.

DETAILED DESCRIPTION OF THE PREFERRED EMBODIMENTS

Figure 1:
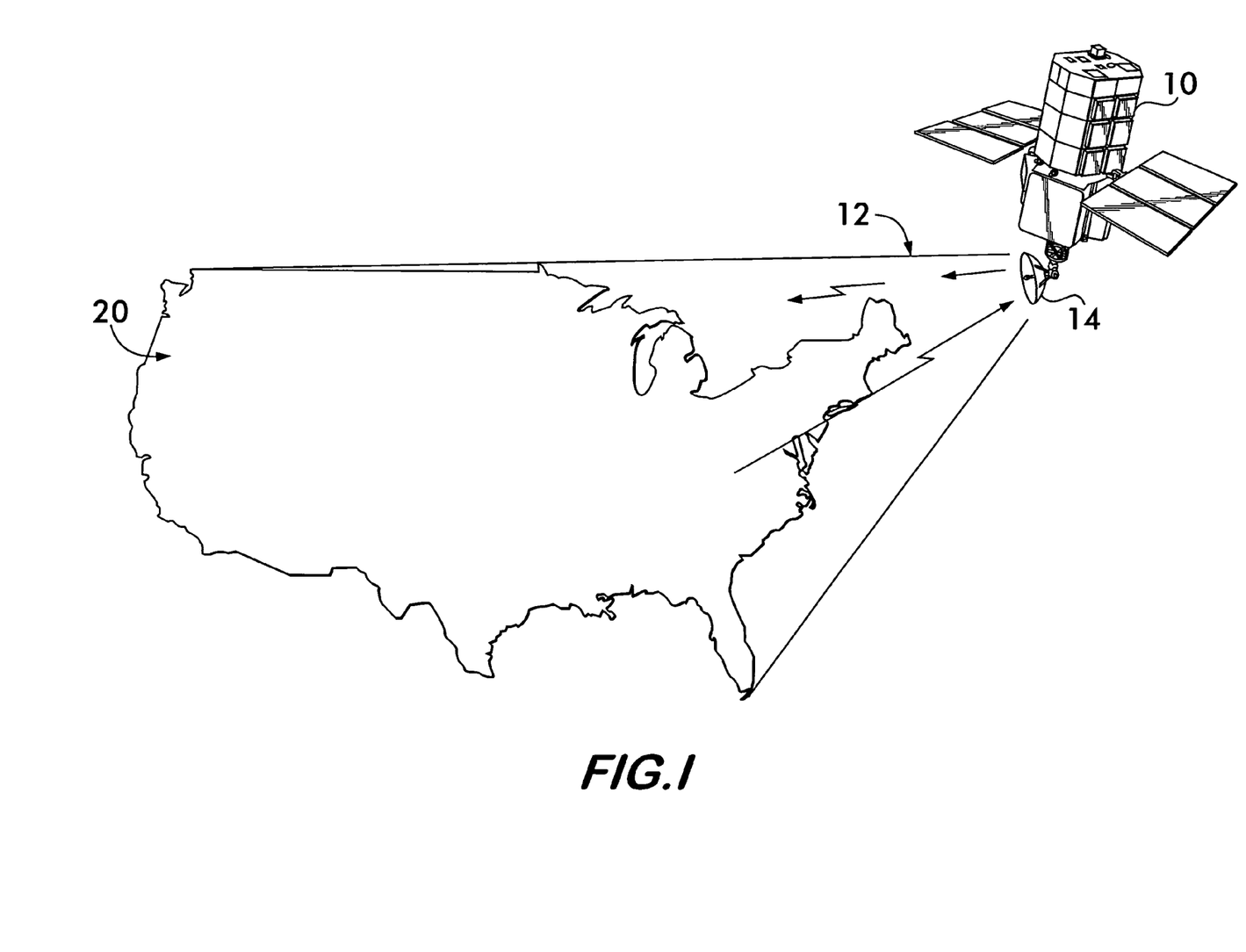
Figure 2:
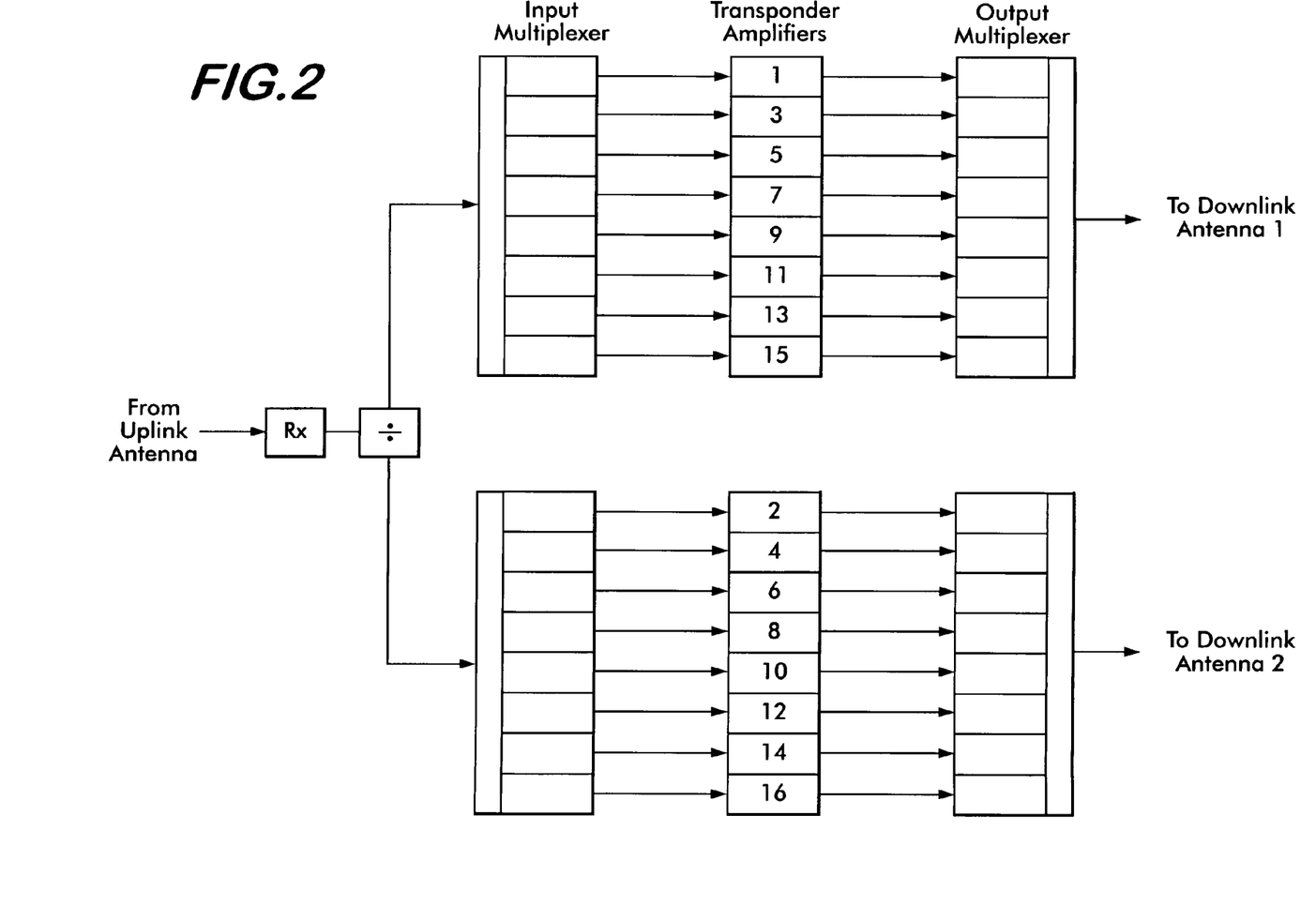

Referring now to the drawings, wherein like numerals indicate like elements, there is shown in FIG. 1 a communication satellite 10 transmitting a single beam 12 to a large area of the earth's surface such as the continental United States (CONUS) 20. However, it is understood that the satellite may be used in connection with any large area on the surface of the earth, such as Europe, Africa, East Asia, Brazil or other large areas wherein the variation in the effects of rain over the coverage area may be significant.

The method and system of the present invention pertain to transmit and/or receive links, or simultaneously transmitting and receiving links, for any kind of signal, analog or digital, or any kind of modulation, coding, signal structure or the like such as TDM, FDM, or CDM or TDMA, FDMA or CDMA, etc.

The method and system of the present invention may be utilized in any type of a communication satellite system using antennas whose radiation characteristics are fixed, but the invention may find its widest use in the broadcast satellite service (BSS). The invention may be utilized to minimize the cost of communication satellites in the broadcast satellite services (BSS), and fixed satellite services (FSS) and in the mobile satellite services (MSS), operating at frequencies in the higher frequency bands, typically 10 GHz or higher, where the variation in the effects of rain are significant over the coverage area. The method of the present invention may also apply to lower frequencies if the availability objectives due to rain are exceedingly high, say over 99.9%. The spacecraft antenna must be electrically large so that its gain profile may vary over the service area in order to compensate for rain effects and slant range effects occurring over the same service area. Slant range is the distance from a subscriber earth station within the service area to the satellite. This variation in slant range over the service area is small, but significant in most cases, depending on the size of the service area.

A new band becomes available for broadcast satellite service (BSS) in 2007 which is referred to as the 25/17 GHz band. The downlink is 17.3-17.8 GHz and the uplink is 24.75-25.25 GHz. The downlink band at 17 GHz is significantly higher than the existing BSS downlink band at 12 GHz, exacerbating the rain effects. The present invention may be particularly useful in the new 25/17 GHz band for broadcast satellite service. However, the present invention may also be used in the current BSS, FSS and MSS frequencies.

For communication satellite operating at approximately 10 GHz or above, rain can cause significant signal fading or decreased signal receptivity, exhibited by attenuation of the signal by the rain and by an increase in the earth station antenna temperature due to the rain attenuation. In addition, the slant range from the satellite to each subscriber also may be compensated if the service area is large.

In the communications satellite industry, the effects of rain are determined by rain models which enable engineers to calculate or predict the rain effects. The rain model most used by the industry is the ITU model, identified as Recommendation ITU-R P.618-8, as modified from time to time. These "rain model" standards enable a computation of the effects of rain at any desired point on the earth's surface. Other rain models, such as the Crane Rain Model also may be used, provided they are of sufficient accuracy.

In accordance with the present invention, antenna 14, as shown in FIG. 1, provides a single beam 12 over the coverage area such that any signal input to the antenna can be received anywhere in the coverage area. However, the antenna gain profile must vary from point to point over the coverage area in order to compensate for the effects of rain and slant range differences. Three broad types of antennas may be considered, a reflector-type antenna, a phased-array antenna or a lens antenna.

Reflector antennas may be front fed or cassegraine fed, from the rear. A presently preferred arrangement is an offset antenna which consists of a segment of a parabola wherein the feeds are located outside the main beam (i.e. secondary beam) of the antenna as illustrated in FIG. 3A.

Figure 3A:
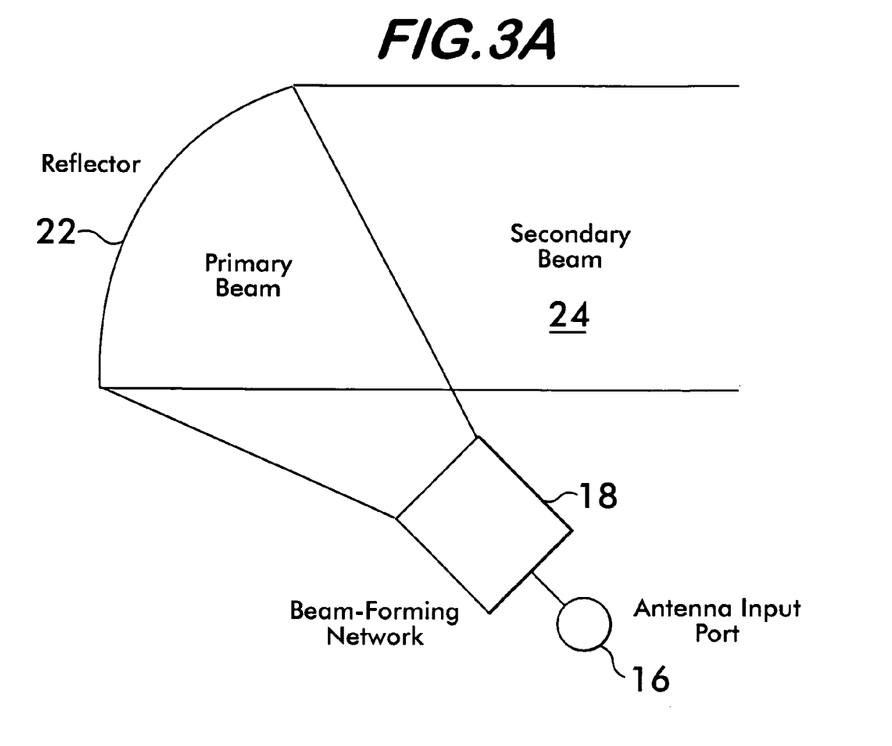

Referring now to FIG. 3A, there is shown an antenna input port 16 which feeds a beam-forming network 18. Beam-forming network 18 includes a multiplicity of feeds or horns which are located outside the main beam of the antenna. The feeds consist of the beam-forming network, a multiplicity of horns, power dividers and phase shifters, or similar devices for illuminating the parabolic reflector 22. The parabola must be large enough and there must be enough feed horns so that the desired gain profile over the coverage area is obtainable. The feed horns 30 may be fed by a series of power dividers 28 and phase shifters 1-N, similar to that illustrated in FIG. 3B, with all being driven by a single antenna input port. Note that the antenna has a single input port 16.

Also note that in FIG. 3A the output of the beam-forming network 18 irradiates reflector 22 and produces secondary beam 24 which comprises beam 12 of FIG. 1.

Figure 3B:
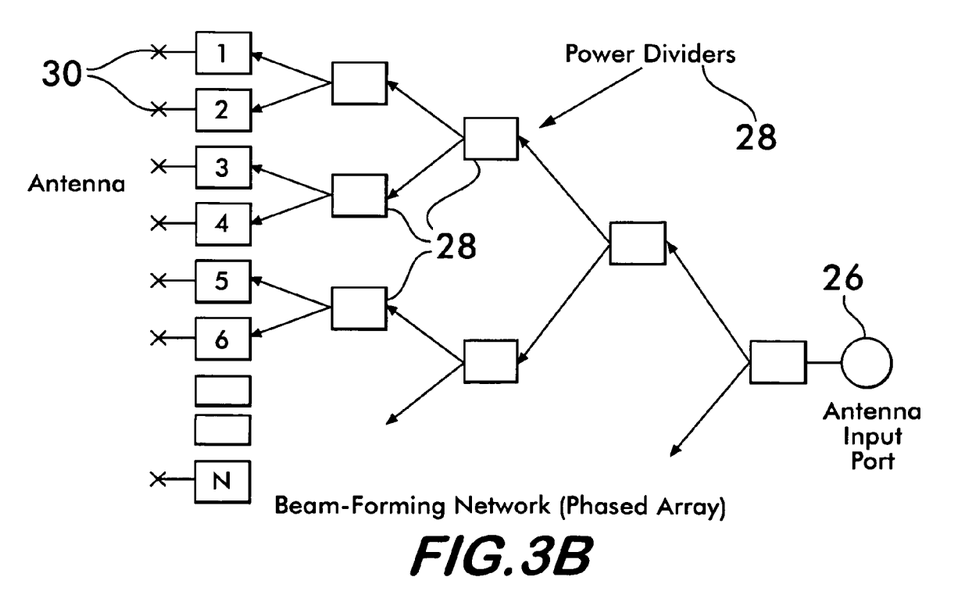

Referring now to FIG. 3B, the beam-forming network is further illustrated in which a single antenna input port 26 feeds a plurality of power divers 28 which, in turn, drive the feed horn of the reflector antenna 30. Similarly, a phased array may be composed of many elements 30, in which each element being fed by the output of the power dividers 28. A beam-forming method may also be used to illuminate a lens antenna.

In communications satellite applications in accordance with the present invention, a single beam illuminates the coverage or service area. That is, the same satellite signals are broadcast over the coverage or service area, and the coverage or service area contains sub-areas having different rain intensities wherein a satellite antenna of adequate size, using the method of the present invention, may be designed such that all earth station subscribers receiving the satellite signal have the same availability irrespective of rain variations. Alternatively, different availability objectives might be assigned, and using the method of the present invention, these availability objectives may be met simultaneously with no excess power. Different rain intensities may cause different rain fades. Rain fading may be significant at frequencies of approximately 10 GHz and higher. If the rain availability objective for the service is 99.9%, then the service is available 99.9% of the time or unavailable 0.1% of the time. If the subscriber availability exceeds the objective then the satellite signal is unnecessarily high, excessive and wasteful. The method of the present invention makes use of this excessive power by transferring it to regions of the service area having higher rain intensity such that all subscribers have the same availability, or the objective availability. Since no subscriber has an excess signal the power radiated by the satellite is at a minimum.

Figure 4:
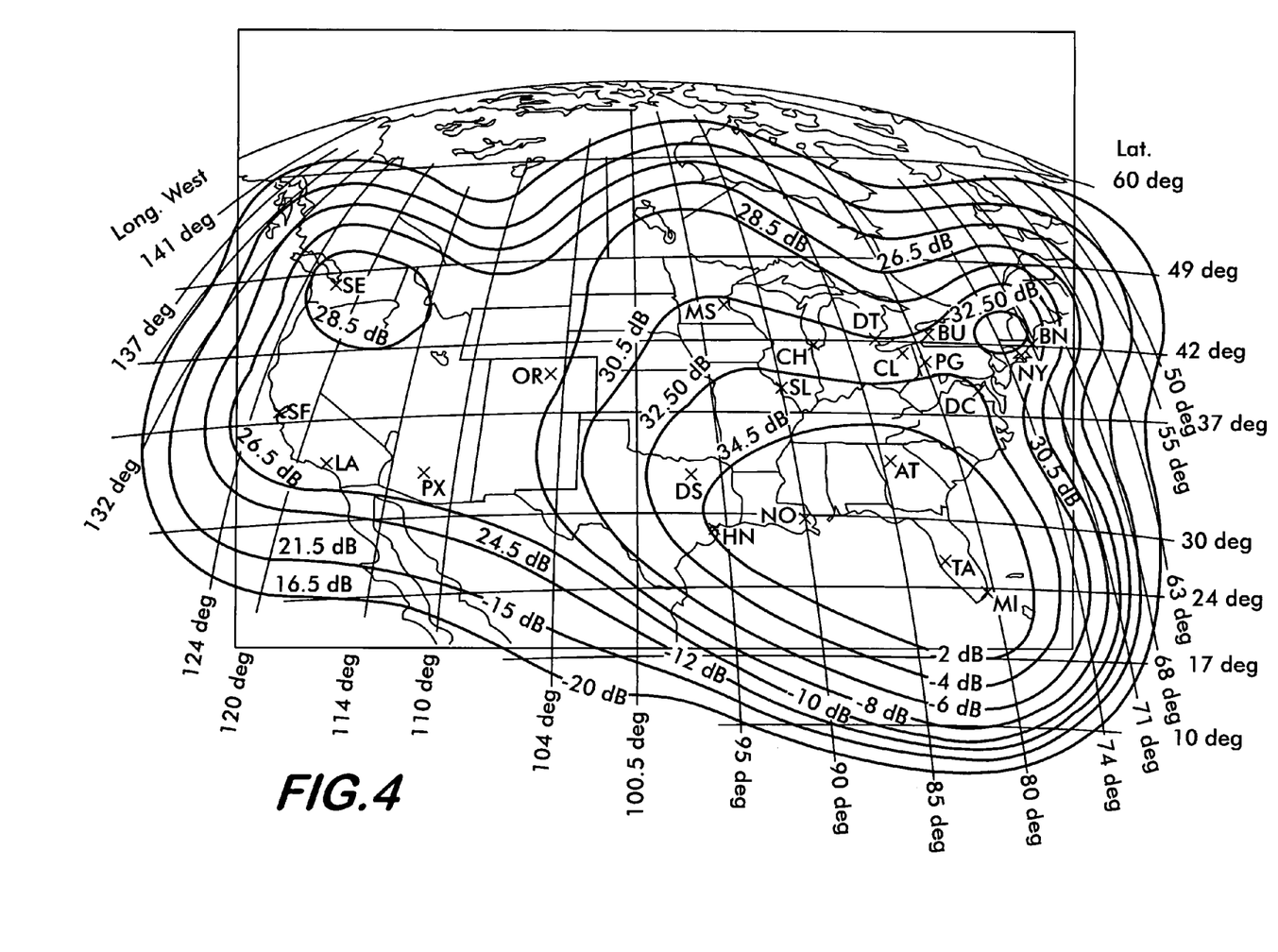

FIG. 4 illustrates one example of a satellite broadcast antenna designed in accordance with the method and system of the present invention. It shows increased power levels for high rain areas such as Miami, Fla. and reduced power levels for relatively low precipitation areas such as Phoenix, Ariz.

The following four examples show how the method of the present invention achieves the minimum power solution.

EXAMPLE 1

Optimum Antenna Design for the BSS in the 25/17 GHz Band

This example compares two designs, one uses an antenna design typical of the industry today, based on FCC and ITU applications for service and the other is the optimum case, based on the method of the present invention. The two designs assume common parameters which are listed in Table 1.

TABLE 1

| LIST OF ASSUMPTIONS FOR THE TWO DESIGNS. | |
|---|---|
| Satellite Location | 100.5 W |
| Rain Availability, % | 99.9 (99.8 for Miami) |
| Subscriber Antenna, cm | 45 |
| Subscriber Earth Station Noise Temp. dBK | 20.4 (clear sky conditions) |
| Uplink C/N + I, dB | 24.8 |
| Uplink Antenna, meters | 6 |
| Number of Transponders | 16 (in two groups of 8) |
| Transponder Bandwidth, MHz | 26 |
| Uplink Frequency, GHz | 25 |
| Downlink Frequency, GHz | 17.55 |
| Uplink Transmitter Loss, dB | 3 |
| Downlink Transmitter Loss, dB | 2.5 |
| Threshold CNR, dB | 6.90 dB |

Locations or points are either at or near major cities or at locations where the rain intensity is changing. The number of points is selected in order to characterize the antenna performance to sufficient accuracy. Any number of points may be used. Other values than those listed in Table 1 may be selected, however, the values listed in Table 1 are believed to be typical for the industry. The assumed threshold carrier-to-noise ratio, CNR=6.90 dB is based on 8PSK modulation and a variation of a Turbo code. Other modulations and other codes may be chosen. The results of the analysis are given in Table 2.

TABLE 2

COMPARISON OF TYPICAL BSS DESIGN IN THE 25/17 GHZ BAND WITH THE OPTIMUM DESIGN.

| Location Point (Lat/Lon) | DL Rain Atten dB | Typical Ant Gain dBi | DL C/N + I dB | Optimum Ant Gain dBi | DL C/N + I dB |
|---|---|---|---|---|---|
| 1 (47.62/122.33) | 4.72 | 32.2 | 10.56 | 31.82 | 6.908 |
| 2 (39.75/105.00) | 1.97 | 32.2 | 14.03 | 27.62 | 6.917 |
| 3 (40.78/73.97) | 5.64 | 34.2 | 11.38 | 32.89 | 6.911 |
| 4 (34.05/118.25) | 2.93 | 32.2 | 12.88 | 29.11 | 6.918 |
| 5 (35.15/90.05) | 8.57 | 33.0 | 7.44 | 36.04 | 6.919 |
| 6 (33.75/84.38) | 9.62 | 34.2 | 7.49 | 37.20 | 6.919 |
| 7 (25.77/80.20) | 10.26 | 36.2 | 8.79 | 37.80 | 6.921 |
| 8 (42.21/71.08) | 6.74 | 32.2 | 8.37 | 34.24 | 6.909 |
| 9 (41.83/87.62) | 5.66 | 32.2 | 9.67 | 32.84 | 6.915 |
| 10 (44.98/93.23) | 5.77 | 32.2 | 9.51 | 33.00 | 6.913 |
| 11 (33.48/112.07) | 2.85 | 32.2 | 13.02 | 28.94 | 6.920 |
| 12 (32.77/96.77) | 6.46 | 32.2 | 8.98 | 33.60 | 6.921 |
| 13 (29.75/95.35) | 10.23 | 34.2 | 6.98 | 37.73 | 6.922 |
| 14 (38.58/90.20) | 7.86 | 33.0 | 8.12 | 35.32 | 6.917 |
| 15 (40.77/111.90) | 2.80 | 31.0 | 11.99 | 28.98 | 6.915 |
| 16 (48.47/103.98) | 2.80 | 32.2 | 12.85 | 29.12 | 6.911 |
| 17 (27.18/98.47) | 8.31 | 34.2 | 8.97 | 35.61 | 6.924 |
| 18 (28.37/98.28) | 10.33 | 34.2 | 6.90 | 37.07 | 6.924 |

Note. Latitude is in degrees north and longitude is in degrees west. DL = Downlink and C/N + I is the threshold CNR including I, interference due to adjacent satellites, cross polarization etc.

The typical antenna gain used by the industry appears to maximize the antenna gain over all of CONUS, with the maximum gain at or near Miami. The variation of antenna gain over CONUS is 5.2 dB. The minimum carrier to noise ratio, C/N+I, is 6.90 dB, achieved near Houston. Everywhere else there is excess signal strength, as evidenced by the higher C/N+I for the other 17 points. In the optimized case, the antenna gain is required to vary from 37.8 dBi in the southeast to 27.6 dB in the northwest, a range of 10.2 dB. The actual rain attenuation varies from 10.33 dB to 2.80 dB, a range of 7.53 dB; sky noise and slant range differences account for the rest.

The satellite power for the typical example is 904 watts per channel and for the optimized case 395 watts per channel. The total RF transmitter power for the typical case is 904 watts×16 transponders=14,464 watts; for the optimized case this is 395 watts×16 transponders=6,320 watts, or 25,806 DC watts and 11,276 DC watts, respectively. Adding an estimated 500 watts for other payload and spacecraft elements, the total solar array power for the typical design is estimated to be 29.6 kilowatts for the typical design and for the optimized design is 13.6 kilowatts. Thus, the optimized antenna design, based on the method of the present invention greatly reduces the required transmitter power and total spacecraft power. It is apparent that the method of the present invention will greatly reduce the satellite cost and the cost of service.

An example reflector antenna design was performed to evaluate the effectiveness of the design procedure. The reflector was approximately 1.2 meters with 32 feeds. A first cut antenna design resulted in the following performance.

| Design Points | Objective Gain, dBi | First Cut Antenna Gain, dBi | Difference dB |
|---|---|---|---|
| Seattle | 29.8 | 29.5 | −0.3 |
| Denver | 25.6 | 26.2 | +0.6 |
| New York | 30.9 | 31.7 | +0.8 |
| Los Angeles | 27.1 | 27.2 | +0.1 |
| Memphis | 34.0 | 34.0 | 0.0 |
| Atlanta | 35.2 | 35.2 | 0.0 |
| Miami | 35.8 | 35.8 | 0.0 |
| Boston | 32.2 | 32.0 | −0.2 |
| Chicago | 30.8 | 31.3 | +0.5 |
| Minneapolis | 31.0 | 30.7 | −0.3 |
| Phoenix | 26.9 | 27.0 | +0.1 |
| Dallas | 31.6 | 33.5 | +1.9 |
| Houston | 35.7 | 34.7 | −1.0 |
| St Louis | 33.3 | 33.0 | −0.3 |
| Salt Lake City | 27.0 | 28.0 | +1.0 |
| Minot | 27.1 | 29.0 | +1.9 |
| Waco | 33.6 | 33.5 | −0.1 |

This first cut antenna design shows good conformance over CONUS but with a deficiency in antenna gain in the vicinity of Houston and a sufficiency of antenna gain for Dallas. Adjusting the relative power of the corresponding feed horns, and other adjustments will reduce the discrepancies between the desired and realizable antenna. The antenna size and the number of feeds in the beam-forming network can be increased to achieve any degree of conformance.

EXAMPLE 2

Optimum Antenna Design for the BSS in the 17/12 GHz Band

This example compares two designs, one is typical of the industry today, based on FCC and ITU applications for service and the optimum case, based on the method of the present invention. The two designs have common assumptions which are listed in Table 3.

TABLE 3

LIST OF ASSUMPTIONS OF THE TWO DESIGNS.

| | |
|---|---|
| Satellite Location | 114.5 W |
| Rain Availability, % | 99.9 |
| Subscriber Antenna, cm | 45 |
| Subscriber Earth Station Noise Temp. dBK | 20.4 (clear sky conditions) |
| Uplink C/N + I, dB | 25.0 |
| Uplink Antenna, m | 6 |
| Number of Transponders | 16 (in two groups of 8) |
| Transponder Bandwidth, MHz | 26 |
| Uplink Frequency, GHz | 17.55 |
| Downlink Frequency, GHz | 12.45 |
| Uplink Transmitter Loss, dB | 3 |
| Downlink Transmitter Loss, dB | 2.5 |
| Threshold CNR, dB | 6.90 dB |

Locations or points are either at or near major cities or at locations where the rain intensity is changing. The number of points is selected in order to characterize the antenna performance to sufficient accuracy. Any number of points may be used. Other values than those listed in Table 3 may be selected, however, these values are believed to be typical for the industry. The threshold CNR=6.90 dB is based on 8PSK modulation and Turbo coding. Other modulations and other codes may be chosen. The results of the analysis are given in Table 4.

TABLE 4

COMPARISON OF TYPICAL BSS DESIGN IN THE 17/12 GHZ BAND WITH THE OPTIMUM DESIGN.

| Location Point (Lat/Lon) | DL Rain Atten dB | Typical Ant Gain dBi | DL C/N + I dB | Optimum Ant Gain dBi | DL C/N + I dB |
|---|---|---|---|---|---|
| 1 (47.62/122.33) | 2.43 | 32.5 | 10.78 | 29.55 | 6.919 |
| 2 (39.75/105.00) | 1.38 | 31.2 | 14.47 | 27.41 | 6.930 |
| 3 (40.78/73.97) | 3.63 | 34.2 | 10.49 | 31.56 | 6.906 |
| 4 (34.05/118.25) | 1.70 | 31.2 | 11.06 | 27.95 | 6.938 |
| 5 (35.15/90.05) | 4.69 | 33.2 | 8.65 | 32.77 | 6.927 |
| 6 (33.75/84.38) | 5.38 | 34.5 | 8.97 | 33.70 | 6.924 |
| 7 (25.77/80.20) | 8.02 | 36.2 | 7.72 | 36.80 | 6.926 |
| 8 (42.21/71.08) | 4.38 | 31.2 | 6.90 | 32.68 | 6.901 |
| 9 (41.83/87.62) | 3.36 | 32.2 | 9.28 | 31.03 | 6.918 |
| 10 (44.98/93.23) | 3.30 | 31.2 | 8.48 | 30.94 | 6.917 |
| 11 (33.48/112.07) | 1.71 | 30.2 | 10.24 | 27.95 | 6.938 |
| 12 (32.77/96.77) | 3.51 | 32.2 | 9.32 | 31.02 | 6.934 |
| 13 29.75/95.35) | 5.30 | 34.2 | 8.96 | 33.43 | 6.936 |
| 14 (38.58/90.20) | 4.36 | 32.2 | 8.10 | 32.38 | 6.923 |
| 15 (40.77/111.90) | 1.69 | 31.2 | 10.96 | 28.05 | 6.929 |
| 16 (48.47/103.98) | 1.76 | 32.3 | 11.56 | 28.34 | 6.917 |
| 17 (27.18/98.47) | 4.31 | 32.2 | 8.41 | 32.07 | 6.940 |
| 18 (28.37/98.28) | 4.93 | 34.2 | 9.42 | 32.92 | 6.939 |

Note. Latitude is in degrees north and longitude is in degrees west. . DL = Downlink and C/N + I is the threshold CNR including I, interference, due to adjacent satellites, cross polarization etc.

The typical antenna gain used by the industry appears to maximize the antenna gain over all of CONUS, with the maximum gain at or near Miami. The variation of antenna gain over CONUS is 6.0 dB. The minimum carrier to noise ratio, C/N+I, is 6.90 dB, achieved near Boston. Everywhere else there is excess signal strength, as evidenced by the higher C/N+I for the other 17 points. In the optimized case, the antenna gain is required to vary from 36.8 dBi in the southeast to 27.41 dB in the west, a range of 10.2 dB. The actual rain attenuation varies from 10.33 to 2.80 dB a range of 9.39 dB; sky noise and slant range differences account for the rest.

The satellite power for the typical example is 376 watts per channel and for the optimized case is 268 watts per channel. The total RF transmitter power for the typical case is 376 watts×16 transponders=6,016 watts; for the optimized case this is 268 watts×16 transponders=4,288 watts, or 10,733 DC watts and 7,650 DC watts, respectively. Adding an estimated 500 watts for other payload and spacecraft elements, the total solar array power for the typical design is estimated to be 13.0 kilowatts and for the optimized design is 9.6 kilowatts. Thus, the optimized antenna design, based on the method of the present invention greatly reduces the required transmitter power and total spacecraft power. It is apparent that the method of the present invention will greatly reduce the satellite cost and the cost of service.

EXAMPLE 3

Comparison of Typical FSS Design in the 30/20 GHz Band with the Optimum Design

The application considered in this example is a Broadband system providing high speed two-way interconnection with the Internet. A return link from the subscriber is required and this is provided, in the example, by a small receive-transmit earth station. This example compares two uplink designs in the 30 GHz FSS band; one is typical of the industry today, based on FCC and ITU applications for service and the optimum case, based on the method of the present invention. In this case, the satellite receive antenna gain over CONUS is shaped in order to conform to the uplink rain attenuation and slant range variations, resulting in all uplink subscribers having the same subscriber antenna, power amplifier and rain availability. The two designs have common assumptions which are listed in Table 5.

TABLE 5

LIST OF ASSUMPTIONS OF THE TWO DESIGNS.

| | |
|---|---|
| Orbital Location | 114.5 W |
| Rain Availability Objective, % | 99.8 |
| Assumed Data Rate, Kbps | 100-500 |
| Subscriber Antenna, m | 0.6 to 1 |
| Loss, dB | 3 |
| Uplink Frequency, GHz | 29.2 |
| Downlink Frequency, GHz | 19.3 |
| Return Link Gateway CNR, dB | 25 |

The return link from satellite to gateway earth station is received by a large gateway earth station antenna, in order that the uplink be the limiting link, i.e., the downlink from the satellite to gateway earth station will have a high CNR, 25 db, and the uplink from the subscriber to the satellite will be the limiting link, with a threshold CNR=6.9 dB.

Increasing the availability due to rain will increase the range of antenna gain required over the service area. Decreasing the availability objective due to rain will decrease the range of antenna gain required over the service area. The satellite noise temperature is determined only by its receiver noise figure and the warm earth. Consequently, only rain attenuation and slant range differences need to be considered.

TABLE 6

COMPARISON OF TYPICAL FSS DESIGN IN THE 30/20 GHZ BAND WITH THE OPTIMUM DESIGN.

| Location Point (Lat. Long) | UL Rain dB | Slant Range, dB | Relative Antenna Gain dB |
|---|---|---|---|
| 1 (48.49/125.91) | 10.92 | 213.43 | 6.88 |
| 2 (34.50/107.8) | 6.55 | 213.15 | 2.23 |
| 3 (40.486/72.67) | 20.40 | 213.56 | 16.49 |
| 4 (34.46/116.97) | 4.33 | 213.14 | 0 |
| 5 (35.05/90.22) | 21.01 | 213.27 | 16.81 |
| 6 (35.32/85.04) | 23.97 | 213.33 | 19.83 |
| 7 (27.82/81.88) | 36.70 | 213.27 | 32.50 |
| 8 (45.34/71.49) | 15.60 | 213.64 | 11.77 |
| 9 (39.22/91.15) | 19.01 | 213.33 | 14.87 |
| 10 (44.17/85.91) | 16.64 | 213.46 | 12.63 |
| 11 (34.45/112.71) | 5.69 | 213.14 | 1.46 |
| 12 (34.68/99.67) | 13.24 | 213.19 | 8.96 |
| 13 (30.84/98.26) | 22.29 | 213.14 | 17.96 |
| 14 (39.22/91.15) | 19.01 | 213.33 | 14.87 |
| 15 (38.70/123.98) | 11.19 | 213.23 | 6.95 |
| 16 (48.47/103.98) | 6.55 | 213.42 | 2.50 |
| 17 (27.18/98.47) | 19.87 | 213.09 | 15.49 |
| 18 (30.66/106.68) | 9.20 | 213.09 | 4.82 |
| 19 (49.00/92.18) | 14.13 | 213.49 | 10.15 |
| 20 (31.18/89.19) | 23.78 | 213.22 | 19.53 |

Note. Latitude is in degrees north and longitude is in degrees west.

In Table 6 the maximum rain attenuation occurs for point 7 which is near Miami; the minimum rain attenuation occurs for point 4 which is near Los Angeles. The range in rain attenuation is 32.7 dB. The minimum slant range occurs for point 17 which is near Waco and the maximum slant range occurs for point 8 which is near Albany. The range in slant range over CONUS is 0.55 dB. Attenuation in the southeast and northeast is exacerbated by the western satellite location at 114.5W.

Again, the required antenna gain is maximum in the southeast and slowly decreases to the west and north. Given the range of relative gain over CONUS an antenna engineer skilled in the art can develop a satellite antenna design to match the relative gain profile listed in Table 6. With this design, all uplink earth stations can be the same size, have the same power and meet the same availability objective due to rain. Consequently, the earth station cost will be the same for all subscribers. In the standard design, the variation in required eirp, due to the local rain rate will require subscribers in the southeast to purchase larger antennas, or larger HPAs, or both, in order to achieve the desired availability due to rain.

The satellite location at 114.5W, selected for this example, lowers the earth station elevation angles in the eastern U.S. exacerbating the attenuation for these areas. The relative gain is highest in the southeast, Point 7 (Miami-Tampa area). Surrounding Point 7 to the west and north the antenna gain falls, pts 20 (vicinity of New Orleans) 17 (vicinity of Waco) 6 (vicinity of Atlanta) and further decreasing for point 3 (vicinity of New York) point 5 (vicinity of Memphis) point 8 (vicinity of Albany) point 9 (vicinity of St Louis) point 10 (vicinity of Milwaukee) point 13 (vicinity of Austen) and point 17 (vicinity of Waco). The minimum gain is for point 4 (Los Angeles). Point 1 (vicinity of Seattle) has a modest increase in gain compared with the surrounding area because of the heavier rain received off the Pacific Ocean.

The method of the present invention also can be applied to communication satellite systems in other areas of the world. For example, the rain rate in Europe, for 0.01% of the time, varies from 15 mm per hour in northern Scandinavia to 40 mm per hour in Italy. In Africa and East Asia the rain rate for 0.01% of the time, varies from 5 mm/hr to 120 mm/hr. In South America the rain rate, for 0.01% of the time, varies from 10 mm/hr to 122 mm/hr. Thus, the method of the present invention is widely applicable, world-wide.

EXAMPLE 4

Merging the Beam Forming Network and Array of TWTAs to Avoid Voltage Breakdown

Operation of satellites in the broadcasting satellite service and other satellite services having a single beam over the coverage area (the same satellite signal appears everywhere within the service area) particularly for frequencies of 10 GHz and higher, require high transponder powers causing potential problems of voltage breakdown or resonant discharges like multipaction or simply levels of power that cannot conveniently be achieved by a single high power amplifier. In these cases advantage can be taken of the beam forming network of the shaped beam antenna to provide a convenient method for reducing the power required from a single high power amplifier and for reducing the voltage levels in the outputs of the high power amplifiers.

Figure 5:
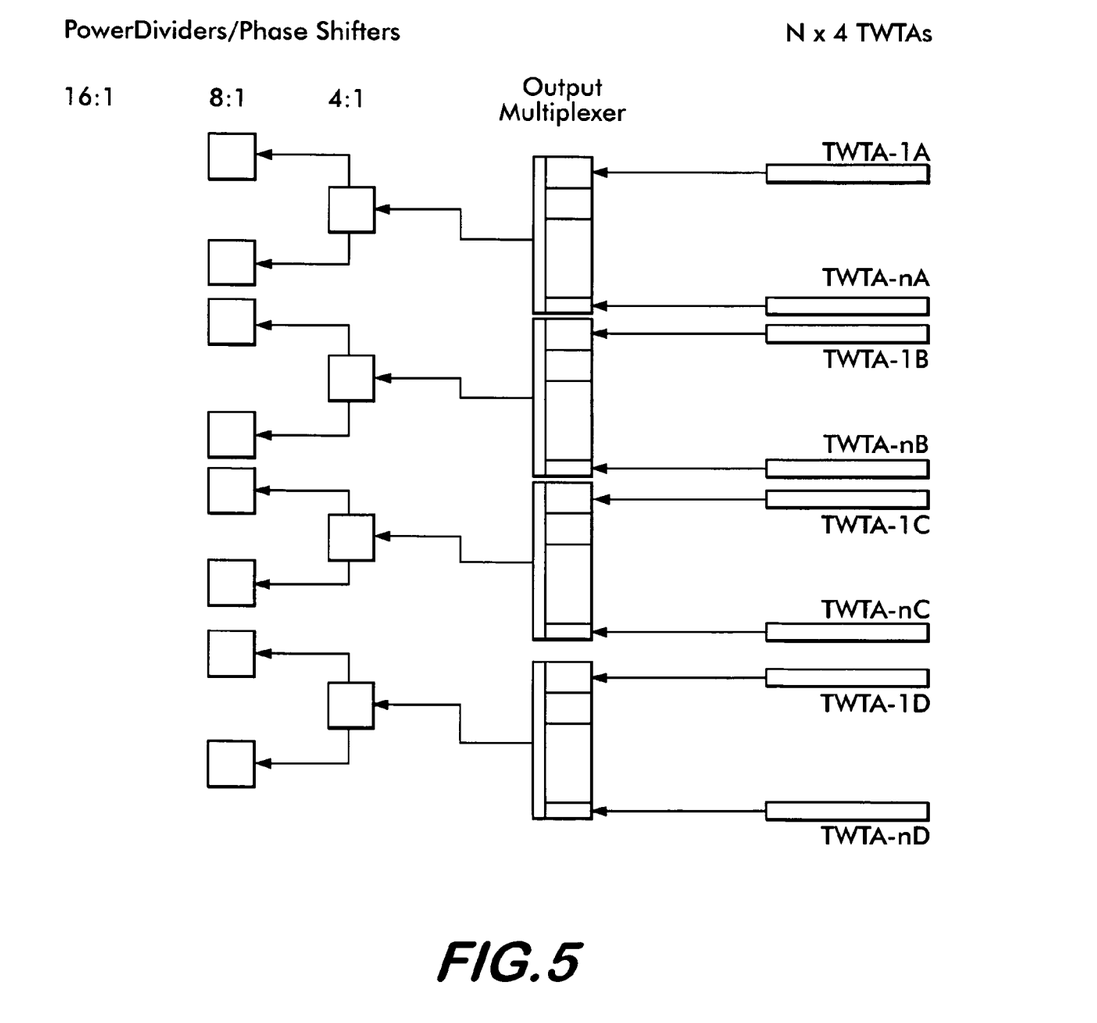
FIG. 5 depicts an arrangement of the traveling wave tube amplifiers, TWTAs, output multiplexers and beam forming matrix that reduces the power level in the circuitry at the output of the traveling wave tube amplifiers, thus reducing the possibility of voltage breakdown.

FIG. 5 depicts an example wherein the output power of channel 1 is provided by the sum of the powers of TWTA-1A, 1B, 1C and 1D, driving the beam forming network's 4 power dividers via four output multiplexers. The output power appearing at any point in the output circuitry of the TWTAs has been reduced to one fourth, greatly reducing the possibility of voltage breakdown. The phase of the signals traversing the four paths must be equal in order for the TWTA powers to be added in the beam forming network. In the example of FIG. 5 if the application is for a broadcasting satellite with two groups of 8 channels feeding two downlink antennas, as described previously, then instead of 8 TWTAs, 32 would be required (and 4 output multiplexers instead of one). Thus the array of output amplifiers and beam forming network elements may be "merged" so that the power level of an individual TWTA is not exceeded or to avoid voltage breakdown, or both.

The present invention may be embodied in other specific forms without departing from the spirit or essential attributes thereof and, accordingly, reference should be made to the appended claims, rather than to the foregoing specification as indicating the scope of the invention.

I claim:

1. A method of broadcast communication from an earth-satellite comprising the steps of:

providing a single antenna beam on said satellite to transmit or receive a single beam having the same signal transmitted to or received from an area on the earth's surface, called a service area, having differing fixed margins over the service area because of average rain fade statistics; providing said antenna with a fixed radiation pattern, said radiation pattern providing relatively increased radiation strength in areas of higher fixed margin and relatively decreased radiation strength in areas of lower fixed margin so that there is no excess fixed margin anywhere in the service area; and transmitting or receiving said single beam signal from said fixed radiation pattern antenna to or from said service area.

2. A method in accordance with claim 1 wherein said step of providing said antenna with a fixed radiation pattern includes the step of utilizing either a reflector antenna, phased array antenna or lens antenna, any one of these types having an appropriate multiple-beam-forming network.

3. A method in accordance with claim 2 wherein the components forming the antenna beam forming network and components forming the power amplifiers driving the antenna beam forming network may be combined or merged to some extent in order to reduce the power level of any device in the signal output paths thereby minimizing the possibility of voltage breakdown.

4. A method in accordance with claim 1 wherein said fixed radiation pattern compensates for differing fixed margins due to differences in rain fade statistics over the service area.

5. A method in accordance with claim 1 wherein said fixed radiation pattern compensates for other systemic changes over the service area such as variations in slant range or interference.

6. A method in accordance with claim 1 wherein said areas of differing fixed margins are populated with subscribers and wherein each subscriber has a defined availability due to rain via the fixed margin.

7. A method of broadcast communication from an earth satellite in accordance with claim 1 wherein said differing average fixed margin varies as a result of average rain fall intensity in accordance with average rainfall intensity statistics.

8. A method of broadcast communication from an earth satellite in accordance with claim 1 where any operating frequency may be chosen in which the average rain statistics vary over the service area and the antenna can be electrically large enough to provide the required variation in gain over said service area.

9. A method in accordance with claim 1 wherein the fade margin for downlinks from satellite to subscribers includes a component due to the attenuation of the signal due to rain attenuation and a component due to increased subscriber antenna temperature due to rain attenuation; these factors, along with other smaller systemic changes over the said area of the earth's surface compose the fixed margin.

10. A method in accordance with claim 1 wherein the rain fade for uplinks from subscribers to satellite includes a component due to the attenuation of the signal due to rain attenuation; this factor, along with other smaller systemic changes over the said area of the earth's surface compose the fixed margin.

11. A method in accordance with claim 1 in which any availability due to rain may be assigned to the subscriber network and some subscribers may have a different availability due to rain provided the defined fixed margins vary systematically over the service area.

12. A method of broadcast communication from an earth-satellite comprising the steps of: providing a single antenna beam on said satellite to transmit or receive a single beam having the same signal transmitted to or received from an area on the earth's surface, called a service area, having differing fixed margins over the service area because of average rain fade statistics; providing said antenna with a fixed radiation pattern based on said service area's average rain fade statistics, said antenna radiation pattern providing relatively increased radiation strength in areas of higher fixed margin and relatively decreased radiation strength in areas of lower fixed margin so that there is no excess fixed margin anywhere in the service area; and transmitting or receiving said single beam signal from said fixed radiation pattern antenna to or from said service area.

13. A method of broadcast communication from and to an earth-satellite, comprising the steps of:
  providing a single antenna beam on said satellite to transmit or receive a single beam having the same signal transmitted to or received from an area on the earth surface, called a surface area, having differing fixed margins over the service area in accordance with average rain fade statistics;
  providing said antenna with a fixed radiation pattern based on said surface areas average rain fade statistics, said antenna radiation pattern providing relatively increased radiation strength in areas of higher fixed margin and relatively decreased radiation strength in areas of lower fixed margin such that there is no excess fixed margin anywhere in the service area;
  transmitting or receiving a single beam signal from said fixed radiation pattern antenna to or from said service area; and
  arranging components forming the antenna beam forming network and components forming power amplifiers driving the antenna beam forming network such that they may be combined and arranged in more than one beam forming network signal path in order to reduce the power level of any device in the signal output paths thereby minimizing the possibility of voltage breakdown.

* * * * *